(12) United States Patent
Takaki et al.

(10) Patent No.: US 10,504,661 B2
(45) Date of Patent: Dec. 10, 2019

(54) HYBRID CAPACITOR AND SEPARATOR FOR HYBRID CAPACITORS

(71) Applicant: Nippon Chemi-Con Corporation, Shinagawa-ku, Tokyo (JP)

(72) Inventors: Kazunori Takaki, Tokyo (JP); Satoru Tsumeda, Tokyo (JP); Shuichi Ishimoto, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 155 days.

(21) Appl. No.: 15/558,945

(22) PCT Filed: Apr. 1, 2016

(86) PCT No.: PCT/JP2016/060947
§ 371 (c)(1),
(2) Date: Sep. 15, 2017

(87) PCT Pub. No.: WO2016/159359
PCT Pub. Date: Oct. 6, 2016

(65) Prior Publication Data
US 2018/0075980 A1 Mar. 15, 2018

(30) Foreign Application Priority Data
Apr. 3, 2015 (JP) .................................. 2015-076533

(51) Int. Cl.
*H01G 11/06* (2013.01)
*H01G 11/52* (2013.01)
(Continued)

(52) U.S. Cl.
CPC ............ *H01G 11/06* (2013.01); *H01G 11/08* (2013.01); *H01G 11/26* (2013.01); *H01G 11/50* (2013.01);
(Continued)

(58) Field of Classification Search
CPC ........ H01G 11/06; H01G 11/50; H01G 11/26; H01G 11/52; H01G 11/32; H01G 11/08; H01G 11/54
See application file for complete search history.

(56) References Cited

U.S. PATENT DOCUMENTS

2002/0195591 A1* 12/2002 Ravet ................... H01B 1/24
252/500
2009/0310282 A1* 12/2009 Aida ..................... H01G 11/06
361/504
(Continued)

FOREIGN PATENT DOCUMENTS

CN 103181015 A 6/2013
EP 2 978 002 A1 1/2016
(Continued)

OTHER PUBLICATIONS

Extended European search report dated Oct. 11, 2018, in European Patent Application No. 16773239.5.
(Continued)

*Primary Examiner* — David M Sinclair
(74) *Attorney, Agent, or Firm* — Shapiro, Gabor and Rosenberger, PLLC (57) ABSTRACT

Provided is a hybrid capacitor with an excellent long-term stability. A hybrid capacitor includes a positive electrode 1 including a positive-electrode active material layer 1a containing a carbon material employing a porous structure or a fibrous structure with an electric double layer capacity, and a negative electrode 2 including a negative-electrode active material 2a containing a material capable of adsorbing and releasing lithium ions. A lithium compound that traps protons is disposed between the positive-electrode active material layer 1a and the negative-electrode active material layer 2a. This hybrid capacitor further includes a separator 3 disposed between the positive-electrode active material (Continued)

layer 1*a* and the negative-electrode active material layer 2*a*, and the separator contains the lithium compound.

14 Claims, 4 Drawing Sheets

(51) Int. Cl.
  *H01G 11/50* (2013.01)
  *H01G 11/08* (2013.01)
  *H01G 11/26* (2013.01)
  *H01G 11/54* (2013.01)
  *H01G 11/32* (2013.01)

(52) U.S. Cl.
  CPC .............. *H01G 11/52* (2013.01); *H01G 11/54* (2013.01); *H01G 11/32* (2013.01); *Y02E 60/13* (2013.01)

(56) References Cited

U.S. PATENT DOCUMENTS

| | | | |
|---|---|---|---|
| 2011/0067230 A1 | 3/2011 | Tan et al. | |
| 2011/0157771 A1* | 6/2011 | Gibson | H01G 9/02 361/500 |
| 2014/0159668 A1 | 6/2014 | Whitacre et al. | |
| 2014/0293507 A1* | 10/2014 | Gadkaree | H01G 9/0029 361/502 |
| 2014/0328005 A1* | 11/2014 | Oh | H01G 11/32 361/502 |
| 2014/0329131 A1* | 11/2014 | Jo | H01G 9/02 429/145 |

FOREIGN PATENT DOCUMENTS

| | | |
|---|---|---|
| JP | 2003-297699 A | 10/2003 |
| JP | 2008-146963 A | 6/2008 |
| JP | 2011-216748 A | 10/2011 |
| JP | 2011-233843 A | 11/2011 |
| WO | WO 2014/148250 A1 | 9/2014 |

OTHER PUBLICATIONS

Office Action dated Sep. 3, 2018, in Chinese Patent Application No. 201680017302.7.

International Search Report from International Patent Application No. PCT/JP2016/060947, dated May 31, 2016.

* cited by examiner

HYBRID CAPACITOR AND SEPARATOR FOR HYBRID CAPACITORS

TECHNICAL FIELD

The present disclosure relates to a hybrid capacitor which applies, to a negative electrode, a material capable of adsorbing and releasing lithium ions, and which also applies, to a positive electrode, a carbon material employing a porous structure or a fibrous structure with an electric double layer capacity, and a separator for the hybrid capacitors.

BACKGROUND ART

Conventionally, in hybrid capacitors, an electrode which applies, for example, lithium titanate as an active material for lithium adsorption and release of a negative electrode is utilized. In such hybrid capacitors, for a positive electrode material, for example, an active charcoal is applied as a carbon material which employs a porous structure or a fibrous structure with an electric double layer capacity. Those negative electrode and positive electrode are opposed to each other via, for example, a cellulosic separator therebetween to form a hybrid capacitor cell.

CITATION LIST

Patent Literatures

Patent Document 1: JP 2011-216748 A

SUMMARY OF INVENTION

Technical Problem

However, such hybrid capacitors have a problem in terms of long-term stability. That is, there is a possibility that a capacity decrease occurs during the cycle use. Hence, a development for a hybrid capacitor having an excellent long-term stability has been desired.

The present disclosure has been proposed in order to address the above technical problems. An objective is to provide a hybrid capacitor having an excellent long-term stability, and a separator for hybrid capacitors allowing the hybrid capacitors to have an excellent long-term stability.

Solution to Problem

The inventors have repeatedly examined in various ways in order to solve the foregoing technical problems, and found that, due to protons produced while driving a hybrid capacitor, the long-term stability of the hybrid capacitor decreases. In addition, the inventors achieved the knowledges such that the long-term stability becomes excellent when the produced protons are trapped, and achieved the present disclosure based on such knowledges.

That is, a hybrid capacitor according to the present disclosure includes:

a positive electrode comprising a positive-electrode active material layer containing a carbon material employing a porous structure or a fibrous structure with an electric double layer capacity; and a negative electrode comprising a negative-electrode active material containing a material capable of adsorbing and releasing lithium ions, in which a lithium compound that traps protons are disposed between the positive-electrode active material layer and the negative-electrode active material layer.

This hybrid capacitor may further include a separator disposed between the positive-electrode active material layer and the negative-electrode active material layer, and the separator may contain the lithium compound. A hybrid capacitor separator containing the lithium compound is also an aspect of the present disclosure.

The lithium compound may be disposed in the vicinity of the positive-electrode active material layer. The lithium compound may have a capacity of equal to or smaller than 10 mAh/g.

The lithium compound may be $Li_2TiO_3$. A specific surface area of the $Li_2TiO_3$ may be equal to or smaller than 100 $m^2/g$.

A weight ratio per a unit area of the lithium compound relative to the carbon material employing the porous structure or the fibrous structure with the electric double layer capacity may be 1:0.1 to 1:1.

The hybrid capacitor may further include an electrolytic solution containing lithium salt as electrolyte at a molar concentration of equal to or greater than 1.8 M.

Advantageous Effects of Invention

According to the present disclosure, a hybrid capacitor with an excellent long-term stability can be provided.

DESCRIPTION OF EMBODIMENTS

[1. Structure]

Figure 1:
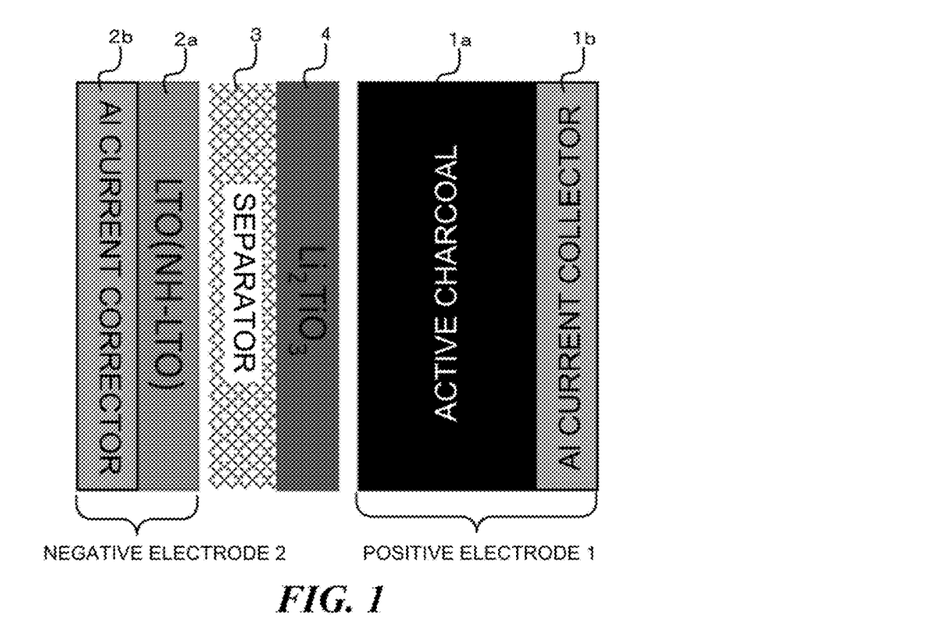
FIG. 1 is an explanatory diagram illustrating an example hybrid capacitor according to a first embodiment.

Hereinafter, embodiments to carry out the present disclosure will be described with reference to FIG. 1. FIG. 1 is an explanatory diagram illustrating an example structure of a hybrid capacitor. The hybrid capacitor of this embodiment includes a positive electrode 1, a negative electrode 2, a separator 3, and a lithium compound layer 4. The positive electrode 1 and the negative electrode 2 are disposed so as to be opposed to each other via the separator 3 and the lithium compound layer 4 in an unillustrated electrolytic solution, thereby forming a hybrid capacitor cell.

(Positive Electrode)

The positive electrode 1 is an electrode that includes a positive-electrode active material layer 1a containing a carbon material employing a porous structure or a fibrous structure with an electric double layer capacity, and a current collector 1b supporting the positive-electrode active material layer 1a. The positive electrode 1 is formed by, for example, joining a sheet-like positive-electrode active material layer 1a to the current collector 1b. The positive-electrode active material layer 1a is formed by, for example, mixing a binder with a mixture of a carbon material employing the porous structure or the fibrous structure with the electric double layer capacity and a conductive aid, molding into a sheet form after kneading. In addition, a mixture solution containing a carbon material employing the porous structure or the fibrous structure with the electric double layer capacity, a conductive agent powder, and a binder may be coated on the current collector 1b by a doctor blade scheme, etc., and dried to obtain the positive-electrode active material layer 1a. The positive-electrode active material layer 1a can also be formed by molding the obtained dispersion into a predetermined shape, and press-bonding on the current collector 1b.

For carbon materials employing the porous structure or the fibrous structure with the electric double layer capacity included in the positive-electrode active material layer 1a, example carbon materials employing porous structure are natural plant tissues like palm cash, synthetic resins like phenol, active charcoals originating from fossil fuels, such as cokes and pitches, carbon black, such as Ketjen black (KB), acetylene black, and channel black, carbon nanohorn, amorphous carbon, natural graphite, artificial graphite, graphitized Ketjen black, and mesoporous carbon. In addition, it is preferable that these carbon materials should be subjected to porosity processes, such as an activating process and an opening process, for use. Example carbon materials employing the fibrous structure are fibrous carbons, such as carbonnanotube (CNT) and carbonnanofiber (CNF). The fibrous carbon may be subjected to an opening process or an activation process to form an opening in the tip or the wall surface of the fibrous carbon.

In the positive-electrode active material layer 1a, as the carbon material employing the porous structure or the fibrous structure with the electric double layer capacity, a carbon material employing the porous structure and the carbon material employing the fibrous structure may be used singly or may be mixed for use.

(Negative Electrode)

The negative electrode 2 is an electrode that includes a negative-electrode active material layer 2a containing a material capable of adsorbing and releasing lithium ions, and a current collector 2b supporting the negative-electrode active material layer 2a. The negative electrode 2 is formed by, for example, joining the sheet-like negative-electrode active material layer 2a to the current collector 2b. The negative-electrode active material layer 2a can be formed by mixing a material capable of adsorbing and releasing lithium ions, with a binder and a conductive aid as required, molding into a sheet form after kneading. In addition, the negative-electrode active material layer 2a may be formed by coating a mixture solution obtained by further adding an appropriate amount of solvent to those materials on the current collector 2b by a doctor blade scheme, etc., and drying.

Example materials capable of adsorbing and releasing lithium ions are carbon materials, such as artificial graphite, natural graphite and hard carbon, conductive polymers, such as polyacene, polyacetylene, polyphenylene, polyaniline, and polypyrrole, alloy materials that form alloy with lithium metal, such as silicon, tin, and aluminum, lithium oxide like lithium titanate, lithium metal. These may be applied singly or in combination of equal to or greater than two kinds. In addition, lithium ions may be doped in these carbon materials or alloy materials that form alloy with lithium metal.

When, for example, lithium titanate is contained in the negative-electrode active material layer 2a as the material capable of adsorbing and releasing lithium ions, lithium titanate can be obtained by mixing a titanium source and a lithium source and calcining. Example titanium sources are titanium dioxide, titanium hydroxide, titanium alkoxide, titanium chloride, and titanium sulfate. Example lithium sources are lithium acetate, lithium nitrate, lithium carbonate, and lithium hydroxide. For example, lithium titanate particles obtained by mixing and calcining titanium dioxide and lithium carbonate at a predetermined ratio can be used. Alternatively, an aqueous solution containing the lithium source and the titanium source may be processed by a spray drying scheme or the like to evaporate the solvent, and the obtained mixture may be calcined.

Further, lithium titanate obtained by these schemes can also be applied by, for example, pulverizing to a nano-size. The pulverization may be wet pulverization or dry pulverization. Example pulverizers are stone mill, ball mill, bead mill, rod mill, roller mill, stirring mill, planetary mill, hybridizer, mechanochemical composite apparatus and jet mill.

(Current Collector)

Conductive materials, such as aluminum, copper, iron, nickel, titanium, steel, and carbon, can be applied as the current collectors 1b, 2b for the positive electrode 1 and the negative electrode 2. In particular, it is preferable to apply aluminum and copper. This is because it has the high thermal conductivity and electron conductivity. As for the shape of the current collector, any shapes, such as a film shape, a foil shape, a plate shape, a mesh shape, an expanded metal shape, and a cylindrical shape can be adopted.

(Binder)

Example binders applied for the positive electrode 1 and the negative electrode 2 are rubbers, such as fluorine-based rubber, diene-based rubber, and styrene-based rubber, fluorine-containing polymers, such as polytetrafluoroethylene and polyvinylidene fluoride, cellulose, such as carboxymethyl cellulose and nitrocellulose, and further, polyolefin resin, polyimide resin, acrylic resin, nitrile resin, polyester resin, phenol resin, polyvinyl acetate resin, polyvinyl alcohol resin, and epoxy resin. These binders may be used singly or in combination of equal to or greater than two kinds.

(Conductive Aid)

Example conductive aid applied for the positive electrode 1 and the negative electrode 2 are conductive carbon powders of carbon black, such as Ketjen black, acetylene black, and channel black, fullerene, carbon nanotube, carbon nanofiber, amorphous carbon, carbon fiber, natural graphite, artificial graphite, graphitized Ketjen black, and mesoporous carbon. Vapor-grown carbon fiber can also be applied. These carbon powders may be used singly or in combination of equal to or greater than two kinds.

(Layout Structure of Lithium Compound)

According to the hybrid capacitor of this embodiment, a lithium compound that traps protons is present between the positive-electrode active material layer 1a and the negative-electrode active material layer 2a. In this embodiment, the positive electrode 1 and the negative electrode 2 are disposed so as to be opposed to each other via the separator 3 and the lithium compound layer 4. An example will be described below in which the lithium compound layer 4 containing a lithium compound is provided on the separator 3.

However, when a lithium compound is formed on the separator 3 as the lithium compound layer 4, the lithium compound can be surely intervened between the positive-electrode active material layer 1a and the negative-electrode active material layer 2a, which is preferable, but the present disclosure is not limited to this case. That is, the lithium compound may be mixed with the separator 3 or may be coated on the positive-electrode active material layer 1a for the positive electrode 1. In addition, the lithium compound may be coated on the negative-electrode active material layer 2a for the negative electrode 2. The lithium compound may be dispersed in the electrolytic solution. That is, it is appropriate if a lithium compound is intervened between the positive-electrode active material layer 1a and the negative-electrode active material layer 2a. In the case in which the lithium compound is intervened between the positive-electrode active material layer 1a and the negative-electrode active material layer 2a, a case in which the lithium compound is contained inside the positive-electrode active material layer 1a or the negative-electrode active material layer 2a is also involved. For example, when the positive-electrode active material layer 1a is formed, a carbon material employing the porous structure or the fibrous structure with the electric double layer capacity may be mixed with the lithium compound.

(Separator)

Example separators 3 that become a base are cellulose, such as kraft, manila hemp, esparto, hemp, and rayon, mixed paper thereof, polyethylene terephthalate, polybutylene terephthalate, polyethylene naphthalate, polyester-based resin of those derivatives, polytetrafluoroethylene-based resin, polyvinylidene-fluoride-based resin, vinylon-based resin, polyamide-based resin, such as aliphatic polyamide, semi-aromatic polyamide, and wholly-aromatic polyamide, polyimide-based resin, polyethylene resin, polypropylene resin, trimethylpentene resin, polyphenylene sulfide resin, and acrylic resin, and these resins can be used singly or in combination.

(Lithium Compound Layer)

The lithium compound layer 4 can be formed by coating, on the separator 3, a slurry prepared by mixing the lithium compound, a solvent, a binder, and the like, using a coater, and removing the solvent by drying. Although the lithium compound layer 4 may be formed on either side of the separator 3, it is preferable to form the lithium compound layer 4 in the vicinity of the positive-electrode active material layer 1a. More specifically, when the positive electrode 1 and the negative electrode 2 are disposed with the separator 3 being present therebetween, the lithium compound layer 4 is preferably formed on the surface facing the positive electrode 1. Note that the lithium compound layer 4 may be formed on not only the one surface of the separator 3 but also both surfaces.

As for the lithium compound, $Li_2TiO_3$, $Li_4Ti_5O_{12}$, $LiNiO_2$, $LiSiO_3$, $LiAlO_2$, $LiFeO_2$, $LiNbO_3$, $Li_2ZrO_3$, $Li_2WO_4$, $LiTaO_3$, $Li_3PO_4$ and the like are applicable. In particular, lithium titanate ($Li_2TiO_3$, $Li_4Ti_5O_{12}$) can be suitably applied for further suppressing a production of hydrogen gas.

The lithium compound is preferably an insulating material having a capacity of equal to or smaller than 10 mAh/g. This is because when the capacity of the lithium compound exceeds 10 mAh/g, an adverse effect such as an increase of leakage current occurs. In particular, it is preferable to apply $Li_2TiO_3$. In addition, the specific surface area of $Li_2TiO_3$ is preferably equal to or smaller than 100 $m^2/g$.

When the specific surface area of the lithium compound is equal to or smaller than 100 $m^2/g$, a production of hydrogen gas can be suppressed, which is preferable. More preferably, when the specific surface area is equal to or smaller than 50 $m^2/g$, a suppression of the hydrogen gas production amount becomes excellent. The value of the specific surface area of the lithium compound can be adjusted by the particle diameter of the lithium compound. For example, when the particle size of the lithium compound is reduced, the specific surface area increases. However, when the particle is made too small, since the amount of water sticking between the particles of the lithium compound increases beyond the protons captured by the lithium compound, and thus it is difficult to obtain a preferable suppressing effect of hydrogen gas. Hence, the specific surface area of the lithium compound is preferably equal to or smaller than 100 $m^2/g$, particularly preferably, equal to or smaller than 50 $m^2/g$.

As for the lithium compound, it is preferable that the weight ratio per unit area of the lithium compound relative to the carbon material employing the porous structure or the fibrous structure with the electric double layer capacity contained in the positive-electrode active material layer 1a should be 1:0.1 to 1:1. When the coating amount of the lithium compound is within this range, the hydrogen gas is suitably suppressed, and the cycle characteristics are improved. The larger the weight ratio of the lithium compound is, the more the production of hydrogen gas is suppressed, but at the weight ratio exceeding 1, the capacity per volume of the capacitor cell decreases. In addition, when the weight ratio is less than 0.1, it is difficult to suppress the production of hydrogen gas. Hence, the suitable weight ratio is 1:0.1 to 1:1. In view of both the amount of lithium compound to be coated and the obtained effect of suppressing hydrogen gas, 1:0.1 to 1:0.5 is preferable. The coating amount can be adjusted by, for example, the thickness of the coated lithium compound.

As for a solvent to be mixed with the lithium compound, water, N-methyl-2-pyrrolidone, or the like, can be applied. Example binders are rubbers, such as fluorine-based rubber, diene-based rubber and styrene-based rubber, fluorine-containing polymers, such as polytetrafluoroethylene and polyvinylidene fluoride, cellulose, such as carboxymethyl cellulose and nitrocellulose, and further, polyolefin resins, polyimide resin, acrylic resin, nitrile resin, polyester resin, phenol resin, polyvinyl acetate resin, polyvinyl alcohol resin, and epoxy resin. These binders may be used singly or in combination of equal to or greater than two kinds.

(Electrolytic Solution)

As for the electrolytic solution, a salt that generates lithium ions, i.e., a lithium salt is applicable. The lithium salt may be added to the solvent as an electrolyte at a molar concentration of equal to or greater than 1.8 M. This is because when the lithium salt is added at the molar concentration of equal to or greater than 1.8 M, capacity deterioration and the DC resistance increase accompanying with the charging and discharging cycle of the hybrid capacitor are suppressed. Example lithium salts are $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, $LiPF_3(C_2F_5)_3$, or a mixture thereof.

Example quaternary ammonium salt to be applied for the electrolytic solution are tetraethylammonium, triethylmethylammonium, and methylethylpyrrolidinium, spirobipyrrolidinium as cations, and example anions are $BF_4^-$, $PF_6^-$, $ClO_4^-$, $AsF_6^-$, $SbF_6^-$, $AlCl_4^-$ or $RfSO_3^-$, $(RfSO_2)_2N^-$, and $RfCO_2^-$ (Rf is a fluoroalkyl group having a carbon number of 1 to 8).

As for the solvent applied to the electrolytic solution, the following solvents are applicable. These solvents may be applied singly or in combination of equal to or greater than two kinds. For example, cyclic carbonic acid ester, chain carbonic acid ester, phosphoric acid ester, cyclic ether, chain ether, lactone compound, chain ester, nitrile compound, amide compound, and sulfone compound are applicable. Example cyclic carbonates are ethylene carbonate, propylene carbonate, butylene carbonate, 4-fluoro-1,3-dioxolan-2-one, 4-(trifluoromethyl)-1,3-dioxolane-2-one, and ethylene carbonate and propylene carbonate are preferable.

Example chain carbonic acid esters are dimethyl carbonate, ethyl methyl carbonate, methyl n-propyl carbonate, methyl isopropyl carbonate, n-butyl methyl carbonate, diethyl carbonate, ethyl n-propyl carbonate, ethyl isopropyl carbonate, n-butyl ethyl carbonate, di-n-propyl carbonate, di-isopropyl carbonate, di-n-butyl carbonate, fluoroethyl methyl carbonate, di-fluoroethyl methyl carbonate, and tri-fluoroethyl methyl carbonate, and dimethyl carbonate and ethyl methyl carbonate are preferable.

Example phosphate esters are trimethyl phosphate, triethyl phosphate, ethyl dimethyl phosphate, and diethyl methyl phosphate. Example cyclic ethers are tetrahydrofuran, and 2-methyltetrahydrofuran. An example chain ether is dimethoxyethane. Example lactone compounds are γ-valerolactone, and γ-butyrolactone. Example chain esters are methyl propionate, methyl acetate, ethyl acetate, and methyl formate. An example nitrile compound is acetonitrile. An example amide compound is dimethylformamide. Example sulfone compounds are sulfolane, methylsulfolane, dimethylsulfone, ethylmethylsulfone, and isopropylsulfone, but the present disclosure is not limited to those types.

[2. Action and Effect]

(Generation of Protons)

First, before describing the action and effect of the present disclosure, knowledges obtained by the inventors upon keenly examining will be described below for a reason of a decrease of a long-term stability according to conventional hybrid capacitors. The inventors have discovered that protons are generated in the electrolytic solution during the operation of the hybrid capacitor. In addition, the inventors have derived that the long-term stability is decreased due to the protons.

It is estimated that protons are generated by the following three phenomena.

Figure 2:
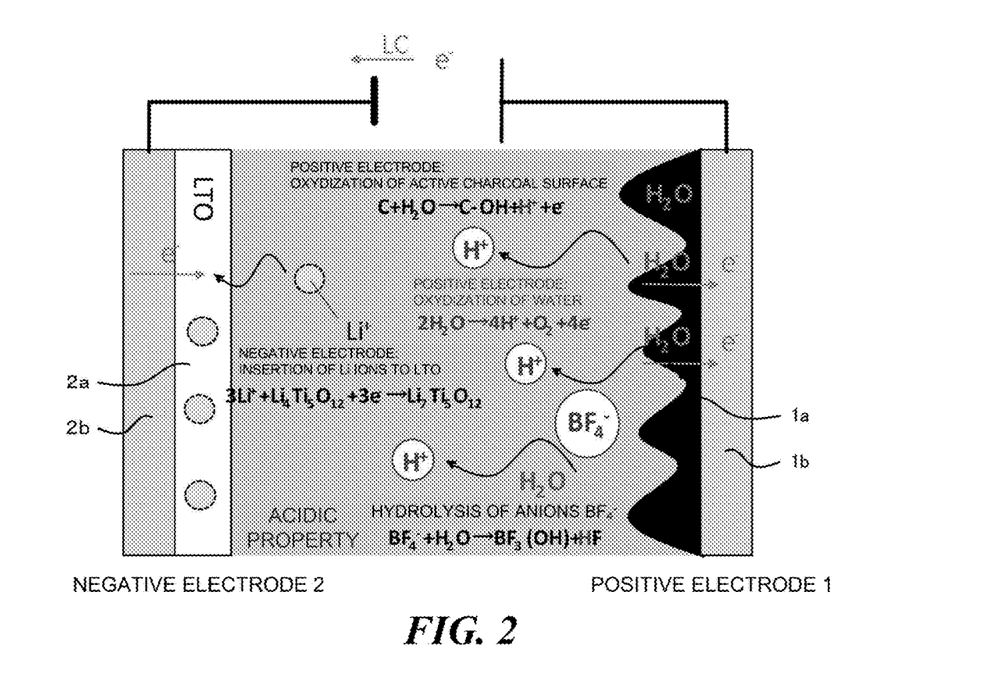
FIG. 2 is an explanatory view illustrating a cause of protons generated in an electrolytic solution of the hybrid capacitor.

As illustrated in FIG. 2, at the negative-electrode-2 side, lithium ions $Li^+$ are inserted into lithium titanate contained in the negative-electrode active material layer 2a. On the other hand, at the positive-electrode-1 side, for example, the carbon C of the active charcoal contained in the positive-electrode active material layer 1a is oxidized in the presence of water $H_2O$ contained in the active charcoal. The reaction formula is indicated below.

$$C+H_2O \rightarrow C-OH+H^++e^- \quad \text{(Chemical Formula 1)}$$

It is considered that OH group is attached to the surface of the active charcoal, and the remaining hydrogen ions $H^+$ are released into the electrolytic solution.

As for a reaction formula for oxidizing water $H_2O$ contained in the active charcoal, the following is also conceivable.

$$2H_2O \rightarrow 4H^++O_2+4e^- \quad \text{(Chemical Formula 2)}$$

It is considered that hydrogen ions $H^+$ are released into the electrolytic solution by oxidative decomposition of water $H_2O$ contained in the active charcoal.

Although $BF_4^-$ is contained as an anion in the electrolytic solution, it is considered that this $BF_4^-$ is hydrolyzed as indicated by the following reaction formula.

$$BF_4^-+H_2O \rightarrow BF_3(OH)+HF \quad \text{(Chemical Formula 3)}$$

It is considered that the hydrogen ion $H^+$ remaining through this hydrolysis is released into the electrolytic solution.

Cycle deterioration occurs due to the hydrogen ions $H^+$ released into the electrolytic solution as described above.

This cycle deterioration means a deterioration when charging and discharging are repeated. According to the conventional hybrid capacitors, hydrogen ($H_2$) gas is produced at the negative electrode side by electrochemical reduction reaction of the hydrogen ions $H^+$ under acidic condition with the hydrogen ions $H^+$. The hydrogen gas that is accumulated in the electrode, etc., forms a gas pool, thereby decreasing the capacity and increasing the resistance. In addition, insertion and desorption of lithium ions $Li^+$ occur at the time of normal charging and discharging, but occurrence of the reduction reaction of hydrogen ions $H^+$ at the time of insertion of lithium ions $Li^+$, unbalancing the insertion and the desorption of lithium ion $Li^+$. Hence, the lithium ion $Li^+$ that is to be inserted is not inserted, sufficient electricity is not be stored, and thus a performance deterioration occurs.

As described above and as derived by the inventors, according to the conventional hybrid capacitors, the capacity decreases during the cycle use under the acidic condition caused by the proton. That is, the long-term stability of the hybrid capacitor decreases due to protons.

On the other hand, in the present disclosure, the following actions and effects are achievable.

(1) In this embodiment, the hybrid capacitor includes the positive electrode 1 including the positive-electrode active material layer 1a containing a carbon material that employs a porous structure or a fibrous structure with the electric double layer capacity, and the negative 2 including the negative-electrode active material 2a containing a material capable of adsorbing and releasing lithium ions, and the lithium compound that traps protons is present between the positive-electrode active material layer 1a and the negative-electrode active material layer 2a. First, the lithium compound has a trapping action of hydrogen ions $H^+$. When, for example, the lithium compound layer 4 is formed using $Li_2TiO_3$, $Li_2TiO_3$ reacts with the hydrogen ions $H^+$ as indicated in the following reaction formula.

$$Li_2TiO_3+2H^+ \rightarrow TiO_2 \cdot H_2O(H_2TiO_3)+2Li^+ \quad \text{(Chemical Formula 4)}$$

By this reaction, protons produced in the electrolytic solution are trapped. Furthermore, the lithium ion $Li^+$ produced by this reaction is utilized as a lithium salt in the electrolytic solution, improving the stability of the electrolytic solution.

As described above, according to the present disclosure in which the protons are trapped by the lithium compound, oxidization by the hydrogen ion $H^+$ is suppressed. This suppresses an increase of the internal resistance, a generation of the hydrogen gas, a decrease of the capacity and the like, and thus a hybrid capacitor with an excellent long-term stability can be provided.

(2) The lithium compound which traps the protons may be contained in the electrolytic solution or formed as a layer in the positive-electrode active material layer 1a or the negative-electrode active material layer 2a, or further may be held in the separator 3. The separator 3 is disposed between the positive-electrode active material layer 1a and the negative-electrode active material layer 2a. By the separator 3 that contains the lithium compound, a manufacturing of the hybrid capacitor with an excellent long-term stability is facilitated, and the lithium compound can be surely provided between the positive-electrode active material layer 1a and the negative-electrode active material layer 2a.

(3) The lithium compound is disposed in the vicinity of the positive-electrode active material layer 1a. As described above, the reason why the protons are released in the electrolytic solution is considered as an oxidizing factor and an anion factor of the carbon material. In this case, when the lithium compound is disposed in the vicinity of the positive-electrode active material layer 1a, for example, the protons originating from the active charcoal can be trapped quickly. Therefore, a hybrid capacitor with a further excellent long-term stability can be provided. Typically, when the lithium compound layer 4 is formed on the separator 3, and the surface on which the lithium compound layer 4 is formed is an opposing surface to the positive electrode 1 of the hybrid capacitor, an aspect for trapping protons efficiently is achievable.

(4) The lithium compound has a capacity of equal to or lower than 10 mAh/g. Therefore, no capacitive component is present between the positive electrode 1 and the negative electrode 2. Accordingly, an increase of the leakage current can be prevented.

(5) The lithium compound is $Li_2TiO_3$. $Li_2TiO_3$ has no capacitive component, and can prevent an increase of the leakage current. In addition, a production of the hydrogen gas can be further surely suppressed.

(6) The specific surface area of $Li_2TiO_3$ is equal to or smaller than 100 m$^2$/g. Hence, a production of hydrogen gas can be further surely suppressed.

(7) The weight ratio per unit area of the lithium compound relative to the carbon material employing the porous structure or the fibrous structure with the electric double layer capacity is 1:0.1 to 1:1. Hence, hydrogen gas is suitably suppressed, and the cycle characteristics can be improved.

EXAMPLES

Hereinafter, the present disclosure will be described in more detail based on examples. The present disclosure is not limited to the following examples.

(1) Relationship Between Kind of Lithium Compound and Amount of Generated Hydrogen Gas In order to specifically study the relationship between the kind of lithium compound and the amount of generated hydrogen gas, a capacitor cell was produced as follows. A sheet-like positive-electrode active material layer containing active charcoal was joined to an aluminum current collector, and thus a positive electrode was prepared. Likewise, a slurry containing lithium titanate and a binder was coated on an aluminum current collector to form a negative-electrode active material layer, and thus a negative electrode was prepared.

The positive electrode and the negative electrode prepared as described above were opposed to each other via a separator formed of rayon therebetween, and laminate sealing using an electrolytic solution of (2M LiBF$_4$/PC) in which 2 moles of LiBF$_4$ as an electrolyte was added to 1 L of a propylene carbonate (PC) solvent was performed so as to form a hybrid capacitor cell. A plurality of cells was prepared by coating different lithium compounds ($Li_2TiO_3$, $Li_4Ti_5O_{12}$, $LiNiO_2$, $LiSiO_3$, $LiAlO_2$, $LiFeO_2$, $LiNbO_3$, $Li_2ZrO_3$, $Li_2WO_4$, $LiTaO_3$, $Li_3PO_4$) on the surface of the separators, and such a lithium compound layer was disposed so as to face the positive electrode, thereby preparing examples 1 to 11. In addition, as a comparative example 1, a separator on which no lithium compound was coated was also prepared.

The cells of the examples 1 to 11 and the comparative example 1 prepared as described above were subjected to a load test at 2.9 V and 60° C., and the amount of generated hydrogen gas at a time point at which 72 hours elapsed is shown in table 1.

TABLE 1

|  | Lithium Compound | Hydrogen Gas Generated Amount |
|---|---|---|
| Comparative Example 1 | None | 0.9 |
| Example 1 | $Li_4Ti_5O_{12}$ | 0.1 |
| Example 2 | $Li_2TiO_3$ | 0.15 |
| Example 3 | $LiNiO_2$ | 0.45 |
| Example 4 | $LiSiO_3$ | 0.45 |
| Example 5 | $LiAlO_2$ | 0.65 |
| Example 6 | $LiFeO_2$ | 0.5 |
| Example 7 | $LiNbO_3$ | 0.5 |
| Example 8 | $Li_2ZrO_3$ | 0.62 |
| Example 9 | $Li_2WO_4$ | 0.6 |
| Example 10 | $LiTaO_3$ | 0.55 |
| Example 11 | $Li_3PO_4$ | 0.6 |

In view of the foregoing, it becomes apparent that in the examples 1 to 11 in which the lithium compound was coated on the separator, a generation of hydrogen gas is suppressed in comparison with the comparative example 1 in which no lithium compound is coated. In particular, when lithium titanate ($Li_2TiO_3$, $Li_4Ti_5O_{12}$) is applied, a generation of hydrogen gas is excellently suppressed. Since the example 1 has a capacity exceeding 10 mAh/g, a capacity component is present between the positive electrode and the negative electrode, and there is a possibility of an increase of the leakage current, etc. In view of other influences like leakage current, it can be said that the lithium compounds of the examples 2 to 11 are preferable which have the capacity of equal to or smaller than 10 mAh/g, and which has the high insulating property.

(2) Specific Surface Area of Lithium Compound and Amount of Generated Hydrogen Gas In order to specifically study the relationship between the specific surface area of the lithium compound and the amount of generated hydrogen gas, a capacitor cell was prepared as follows. The positive electrode, the negative electrode, and the separator were prepared like the above (1). The amount of active charcoal applied for the positive electrode was 4.16 mg/cm$^2$. Conversely, $Li_2TiO_3$ with a coating amount of 1.15 mg/cm$^2$ was coated on a surface of a separator formed of rayon at different specific surface areas (4, 12, 50, and 100 mg$^2$/g) to form a lithium compound layer. A plurality of cells was prepared by disposing the separator so as to face the lithium compound layer to the positive electrode, and thus examples 12 to 15 were prepared. In addition, as comparative example 2, a separator not coated with $Li_2TiO_3$ was also prepared.

The positive electrode and the negative electrode prepared as described above were opposed to each other via the separator therebetween, and laminate sealing using an electrolytic solution of (2M LiBF$_4$/SL) in which 2 moles of LiBF$_4$ as an electrolyte was added to 1 L of a sulfolane (SL) solvent was performed, and thus a hybrid capacitor cell was prepared.

Figure 3:
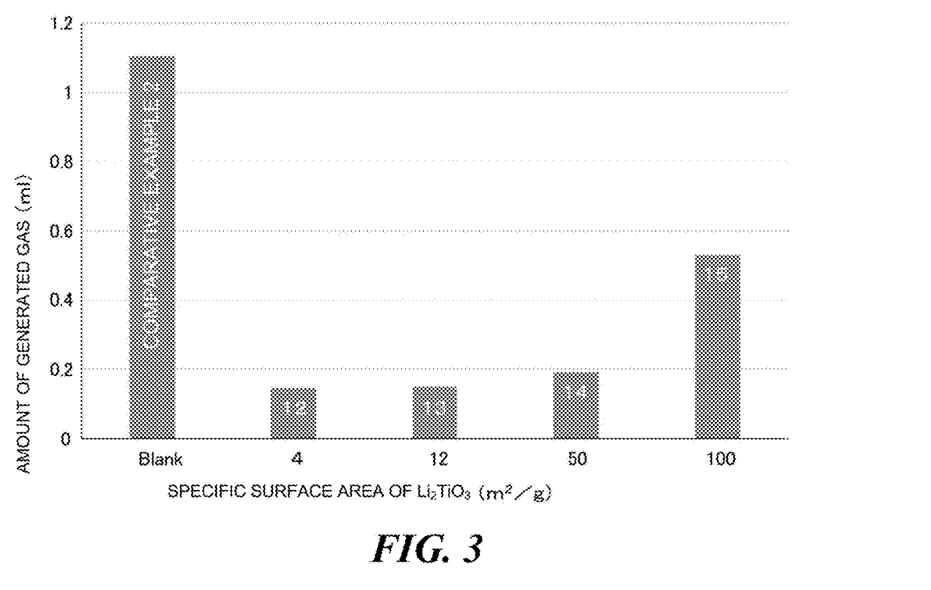
FIG. 3 is a graph illustrating a result of measuring a hydrogen gas generation amount when a load test was performed on the hybrid capacitor.

Loading tests were performed at 3.0 V and 70° C. on the cells according to the examples 12 to 15 and the comparative example 2 prepared as described above, and the amount of generated hydrogen gas at a time point at which 72 hours elapsed is indicated in FIG. 3. It becomes apparent from FIG. 3 that, according to the examples 12 to 15 in which Li$_2$TiO$_3$ was applied to the separator, in comparison with the comparative example 2 in which no Li$_2$TiO$_3$ was coated, under a high-temperature condition, a generation of the hydrogen gas was suppressed at any specific surface areas. More specifically, from the comparison between the example 15 and the comparative example 2, it becomes apparent that when the specific surface area of the lithium compound is equal to or smaller than 100 m$^2$/g, the amount of generated hydrogen gas can be suppressed. Further, from the comparison with the examples 12 to 15, it becomes clear that when the specific surface area is set to be equal to or smaller than 50 m$^2$/g, a suppression of the amount of generated hydrogen gas becomes excellent.

(3) Amount of Coated Lithium Compound and Amount of Generated Hydrogen Gas

In order to specifically study the amount of coated lithium compound and the amount of generated hydrogen gas, a capacitor cell was prepared as follows. The positive electrode and the negative electrode were prepared like the above (1). The amount of active charcoal applied for the positive electrode was 4.16 mg/cm$^2$. In this case, Li$_2$TiO$_3$ with a specific surface area of 12 m$^2$/g was applied to a surface of a separator formed of rayon at different coating amounts (0.57, 1.15, 2.3, and 3.45 mg/cm$^2$) to form lithium compound layers. A plurality of cells was prepared by disposing separators so as to face the lithium compound layer to the positive electrode, and examples 16 to 19 were prepared. In addition, as comparative example 3, a separator on which no Li$_2$TiO$_3$ was coated was also prepared.

The positive electrode and the negative electrode prepared as described above were opposed to each other via the separator therebetween, and a laminate sealing using an electrolytic solution of (2M LiBF$_4$/SL) in which 2 moles of LiBF$_4$ as an electrolyte was added to 1 L of a sulfolane (SL) solvent was performed, and thus a hybrid capacitor cell was prepared.

The cells of the examples 16 to 19 and the comparative example 3 prepared as described above were subjected to a load test at 3.0 V and 70° C., and the amount of generated hydrogen gas at a time point at which 72 hours elapsed was measured. In addition, the capacity retention rate was measured when charging and discharging cycles of charging up to 3.0 V and discharging down to 1.5 V were performed 3000 times. The results are shown in Table 2. In Table 2, the lithium compound is denoted as DLT.

TABLE 2

| | Specific Surface Area of DLT | Positive Electrode Active Charcoal Amount (A) (cm$^2$) | DLT Amount (B) (cm$^2$) |
|---|---|---|---|
| Comparative Example 3 | 12 m$^2$/g | 4.16 mg | 0 mg |
| Example 16 | 12 m$^2$/g | 4.16 mg | 0.57 mg |
| Example 17 | 12 m$^2$/g | 4.16 mg | 1.15 mg |

TABLE 2-continued

| Example 18 | 12 m$^2$/g | 4.16 mg | 2.3 mg |
|---|---|---|---|
| Example 19 | 12 m$^2$/g | 4.16 mg | 3.45 mg |

| | (A):(B) | Capacity Retention Rate 3000 Cycles (%) | Amount of Generated H$_2$ Gas (mL) |
|---|---|---|---|
| Comparative Example 3 | 1:0 | 73% | 1.17 mL |
| Example 16 | 1:0.13 | 80% | 0.30 mL |
| Example 17 | 1:0.27 | 89% | 0.18 mL |
| Example 18 | 1:0.55 | 98% | 0.05 mL |
| Example 19 | 1:0.82 | 106% | 0.02 mL |

As described above, according to the examples 16 to 19 in which the lithium compound was coated on the separator, a generation of hydrogen gas is suppressed at any coating amounts in comparison with the comparative example 3 in which no lithium compound was coated, and the cycle characteristics are also improved. According to the hybrid capacitor of the examples, it becomes apparent that, since a generation of hydrogen gas is suppressed, capacity reduction and performance deterioration are suppressed. In particular, the example 19 in which the weight ratio per unit area of the lithium compound relative to the activated carbon was 1:0.82 shows the best gas generation suppression characteristics and capacity retention rate.

Still further, the evaluation results of other characteristics of the hybrid capacitor are also shown below.

In order to specifically study the leakage current (LC) and the DC resistance (DCIR), a capacitor cell was prepared as follows. The positive electrode and the negative electrode were prepared like the above (1). In this case, Li$_2$TiO$_3$ with a specific surface area of 12 m$^2$/g was coated at 1.15 mg/cm$^2$ on a surface of a separator formed of rayon to form a lithium compound layer, and example 20 was prepared. In addition, as comparative example 4, a separator on which no Li$_2$TiO$_3$ was coated was also prepared.

The positive electrode and the negative electrode prepared as described above were opposed to each other via the separator therebetween, and using an electrolytic solution of (2M LiBF$_4$/SL) in which 2 moles of LiBF$_4$ as an electrolyte was added to 1 L of a sulfolane (SL) solvent, a hybrid capacitor cell was prepared.

Figure 4:
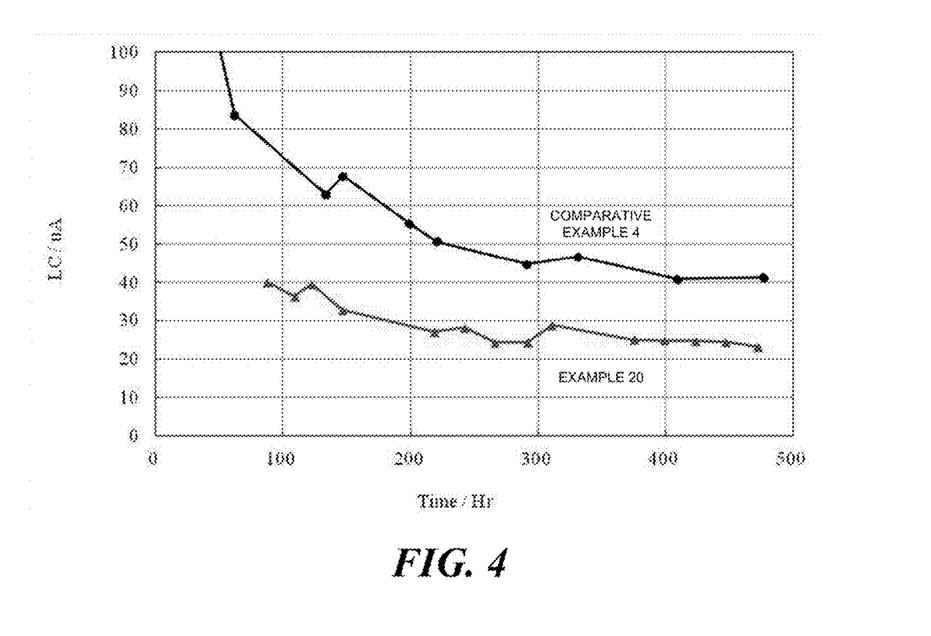
FIG. 4 is a graph illustrating a result of measuring a leakage current when an acceleration test was performed on the hybrid capacitor.
Figure 5:
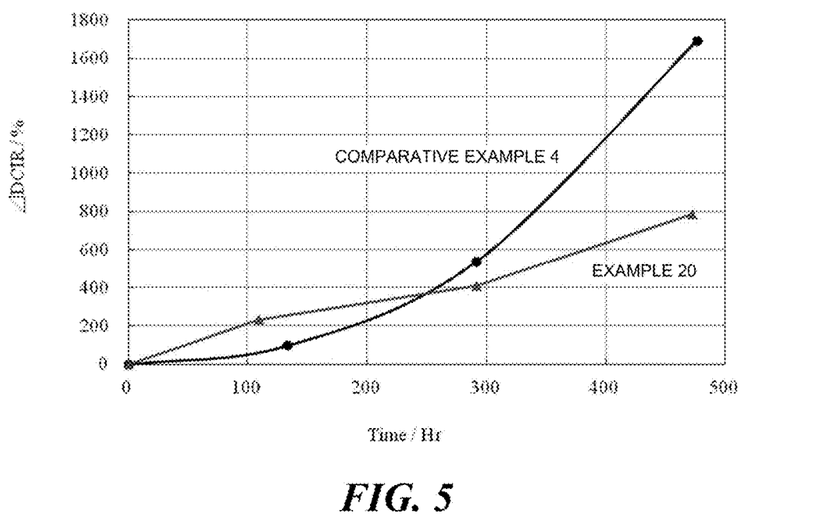
FIG. 5 is a graph illustrating a result of measuring a DC resistance when the accelerated test was performed on the hybrid capacitor.

As for the cells of the example 20 and the comparative example 4 prepared as described above, 3.0 V constant voltage load test was performed at 70 degrees as an acceleration test, and a leakage current (LC) and a DC resistance (DCIR) were measured at an arbitrary time point. The measurement results of LC are shown in FIG. 4, and the measurement results of DCIR are shown in FIG. 5. As shown in FIG. 4, according to the example 20 in which Li$_2$TiO$_3$ is coated on the separator, it becomes clear that the leakage current is reduced in comparison with the comparative example 4 in which no Li$_2$TiO$_3$ was coated. According to the example in which the protons are trapped by the lithium compound, it is considered that protons are not subjected to reduction reaction on the lithium titanate of the negative-electrode active material layer, and a generation of hydrogen gas and a capacity reduction are suppressed.

Further, it becomes clear from FIG. 5 that in the example 20 in which Li$_2$TiO$_3$ is coated on the separator, an increase of the internal resistance is suppressed in comparison with the comparative example 4 in which no Li$_2$TiO$_3$ was coated. According to the example in which the protons are trapped by the lithium compound, it is considered that oxidization of the electrolytic solution by the protons, and hydrolyzing of the electrolytic solution are suppressed, and thus the increase of the internal resistance is suppressed. As described above, in the example 20 in which $Li_2TiO_3$ is coated on the separator, the leakage current (LC) and the DCIR characteristics are remarkably improved.

Figure 6:
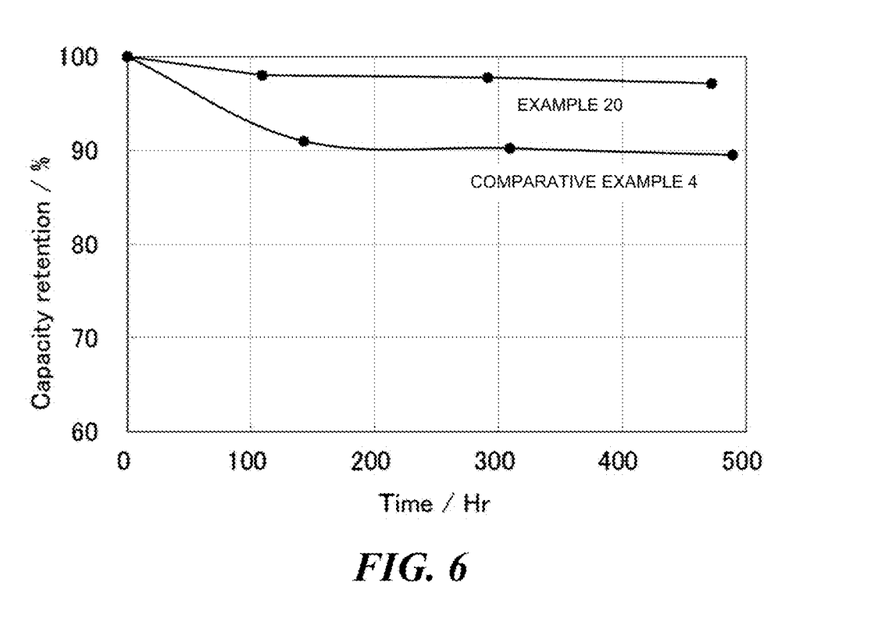
FIG. 6 is a graph illustrating a result of measuring a capacity retention rate when the load test was performed on the hybrid capacitor.

In addition, in order to specifically study the shelf characteristics, the above-mentioned capacitor cell was subjected to a shelf test at 2.5 V and 60 degrees, and the measurement results of the capacity retention rate at an arbitrary time are shown in FIG. 6. From FIG. 6, it becomes apparent that in the example 20 in which $Li_2TiO_3$ is coated on the separator, a decrease of the capacity retention rate is suppressed in comparison with the comparative example 4 in which no $Li_2TiO_3$ is coated. It is considered that the protons are trapped by the lithium compound, and an occurrence of the capacity decrease is suppressed. As described above, according to the example 20 in which $Li_2TiO_3$ is coated on the separator, deterioration by being left is remarkably suppressed.

Furthermore, based on the relationship between the molar concentration of the lithium salt contained in the electrolytic solution and the characteristic change in cycle use, an electrolytic solution used for a hybrid capacitor having a lithium compound disposed between a positive electrode and a negative electrode was studied. When preparing the cell, the solvent of the electrolytic solution was propylene carbonate (PC), and the selected electrolyte as the lithium salt was $LiBF_4$. Next, $LiBF_4$ was added to 1 L of propylene carbonate (PC) in such a way that the molar concentration became 1.2 M to 2.0 M. The concentration of $LiBF_4$ in example 21 was 1.2 M, the concentration of $LiBF_4$ in example 22 was 1.6 M, the concentration of $LiBF_4$ in example 23 was 1.8 M, and the concentration of $LiBF_4$ in example 24 was 2.0 M, Respectively.

The positive electrode and the negative electrode were prepared like the above (1). The separator was a separator formed of rayon, and a lithium compound layer was formed by coating $Li_2TiO_3$ having a specific surface area of 12 $m^2/g$ at 1.15 $mg/cm^2$ on a surface of the separator. Next, the separator was disposed between the positive electrode and the negative electrode in such a way that the lithium compound faced the positive electrode, and a wound-type capacitor element was formed by winding the layers of the positive electrode, the separator, and the negative electrode. This wound-type capacitor element was soaked with each of the electrolytic solutions of the examples 21 to 24, housed in a metal casing, and sealed by a sealing member (lid), thereby preparing wound-type hybrid capacitor cells each having a size of $\phi$45 mm and a height of 150 mm. Other procedures were the same as those of the example 2.

Figure 7:
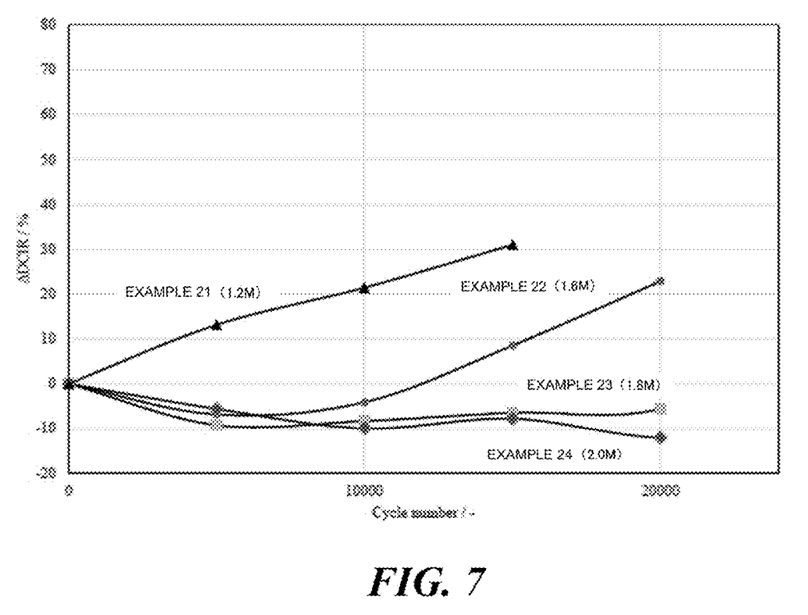
FIG. 7 is a graph illustrating a result of measuring a DC resistance change when a cycle test was performed on the hybrid capacitor.

For these examples 21 to 24, charging and discharging cycle tests were performed at a room temperature within the voltage range between equal to or greater than 2.8 and equal to or smaller than 1.4 V and at the current of 8.3 A, and the electrostatic capacity change ($\Delta$CAP) and the DC resistance change ($\Delta$DCIR) were observed. Table 3 below shows the number of cycles at which the deterioration of electrostatic capacity reaches 20%, and FIG. 7 shows the DC resistance change up to 20000 cycles.

TABLE 3

| Examples | Electrolytic Solution | Number of Cycles |
|---|---|---|
| 21 | 1.2M $LiBF_4$/PC | 15000 times |
| 22 | 1.6M $LiBF_4$/PC | 20000 times |

TABLE 3-continued

| Examples | Electrolytic Solution | Number of Cycles |
|---|---|---|
| 23 | 1.8M $LiBF_4$/PC | Equal to or more than 30000 |
| 24 | 2.0M $LIBF_4$/PC | Equal to or more 30000 |

As shown in table 3, it becomes apparent that, when the molar concentration of the lithium salt contained in the electrolytic solution is equal to or greater than 1.8 M, a deterioration of the electrostatic capacity hardly occurs even when charging and discharging are repeated. In addition, as shown in FIG. 7, it becomes apparent that, when the molar concentration of the lithium salt contained in the electrolytic solution is equal to or greater than 1.8 M, an increase of the DC resistance is suppressed even when charging and discharging are repeated. That is, in the case of a hybrid capacitor having a lithium compound disposed between a positive electrode and a negative electrode, when an electrolytic solution containing a lithium salt of equal to or greater than 1.8 M is applied, a long-term stability is excellent in view of the electrostatic capacity and the DC resistance.

REFERENCE SIGNS LIST

1 Positive Electrode
1a Positive-electrode active material layer
1b Current collector
2 Negative electrode
2a Negative-electrode active material layer
2b Current collector
3 Separator
4 Lithium compound layer

The invention claimed is:

1. A hybrid capacitor comprising:
a positive electrode comprising a positive-electrode active material layer containing a carbon material employing a porous structure or a fibrous structure with an electric double layer capacity; and
a negative electrode comprising a negative-electrode active material containing a material capable of adsorbing and releasing lithium ions,
wherein a lithium compound that traps protons is disposed between the positive-electrode active material layer and the negative-electrode active material layer, and
the lithium compound has a capacity of equal to or smaller than 10 mAh/g.

2. The hybrid capacitor according to claim 1, further comprising a separator disposed between the positive-electrode active material layer and the negative-electrode active material layer,
wherein the separator contains the lithium compound.

3. The hybrid capacitor according to claim 1, wherein the lithium compound is disposed in a vicinity of the positive-electrode active material layer.

4. The hybrid capacitor according to claim 1, wherein the lithium compound is $Li_2TiO_3$.

5. The hybrid capacitor according to claim 4, wherein a specific surface area of the $Li_2TiO_3$ is equal to or smaller than 100 $m^2/g$.

6. The hybrid capacitor according to claim 1, wherein a weight ratio per a unit area of the lithium compound relative to the carbon material employing the porous structure or the fibrous structure with the electric double layer capacity is 1:0.1 to 1:1.

7. The hybrid capacitor according claim 1, further comprising an electrolytic solution containing lithium salt as electrolyte at a molar concentration of equal to or greater than 1.8 M.

8. A hybrid capacitor separator comprising a lithium compound that traps protons,
wherein the lithium compound is $Li_2TiO_3$, and
a specific surfaces area of the $Li_2TiO_3$ is equal to or smaller than 100 $m^2/g$.

9. The hybrid capacitor separator according to claim 8, wherein a lithium compound layer containing the lithium compound is formed on a surface or both surfaces of the separator.

10. The hybrid capacitor separator according to claim 9, wherein the lithium compound layer is formed on the surface facing a positive electrode of the hybrid capacitor.

11. The hybrid capacitor separator according to claim 8, wherein the lithium compound has a capacity of equal to or smaller than 10 mAh/g.

12. A hybrid capacitor comprising:
a positive electrode comprising a positive-electrode active material layer containing a carbon material employing a porous structure or a fibrous structure with an electric double layer capacity;
a negative electrode comprising a negative-electrode active material containing a material capable of adsorbing and releasing lithium ions; and
a separator disposed between the positive-electrode active material layer and the negative-electrode active material layer,
wherein a lithium compound that traps protons is disposed between the positive-electrode active material layer and the negative-electrode active material layer,
the separator contains the lithium compound,
the lithium compound is $Li_2TiO_3$, and
a specific surface area of the $Li_2TiO_3$ is equal to or smaller than 100 $m^2/g$.

13. The hybrid capacitor according to claim 12, wherein a weight ratio per a unit area of the lithium compound relative to the carbon material employing the porous structure or the fibrous structure with the electric double layer capacity is 1:0.1 to 1:1.

14. The hybrid capacitor according to claim 12, further comprising an electrolytic solution containing lithium salt as electrolyte at a molar concentration of equal to or greater than 1.8 M.

* * * * *